Figure 1:
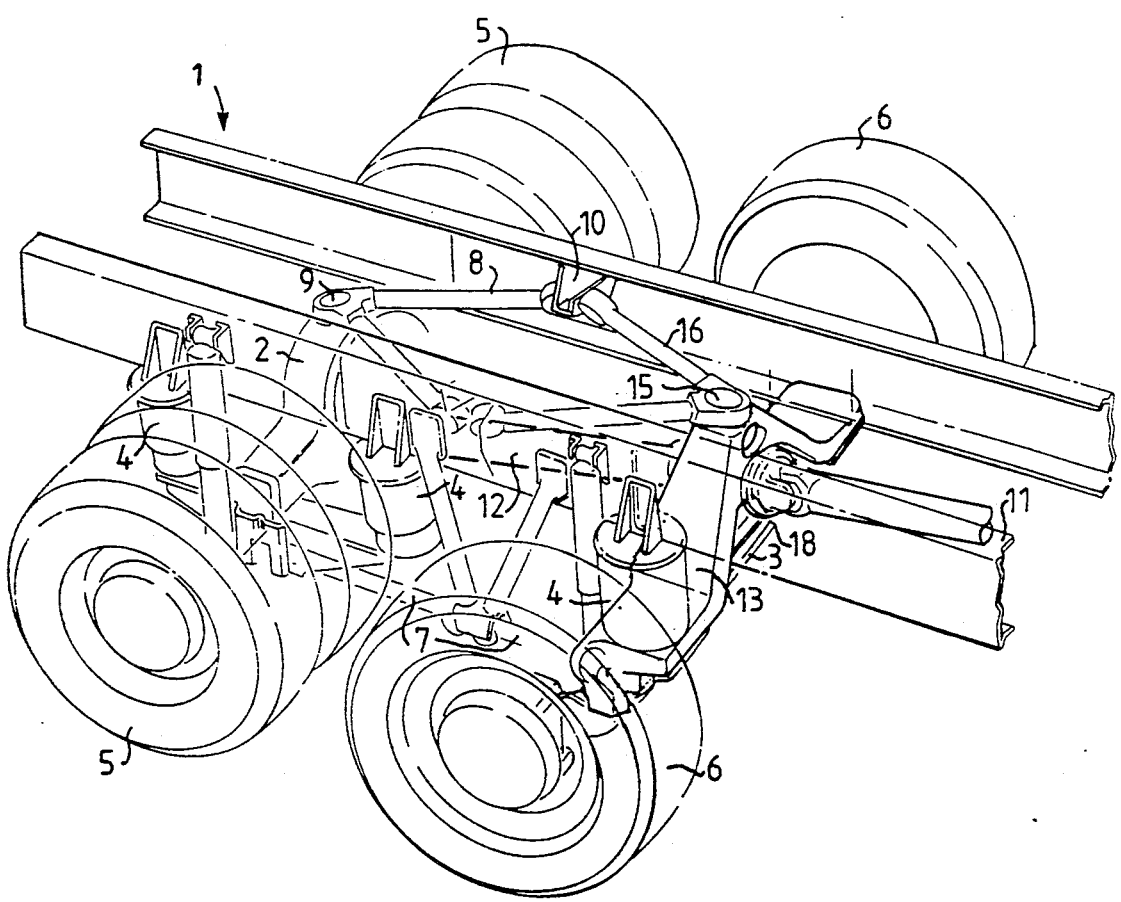

United States Patent [19]

Ljungholm et al.

[11] Patent Number: 5,076,391

[45] Date of Patent: Dec. 31, 1991

[54] BEARING ARRANGEMENT FOR A PROPELLER SHAFT OF A COMMERCIAL VEHICLE

[75] Inventors: Bengt Ljungholm, Angered; Bengt Terborn, Askim; Jan Zachrisson, Kungsbacka, all of Sweden

[73] Assignee: AB Volvo, Goteborg, Sweden

[21] Appl. No.: 605,345

[22] Filed: Oct. 30, 1990

[30] Foreign Application Priority Data

Oct. 31, 1989 [SE] Sweden .................. 8903642

[51] Int. Cl.⁵ .............................. B60K 17/24
[52] U.S. Cl. ................... 180/379; 180/378
[58] Field of Search ............ 180/378, 379, 380

[56] References Cited

U.S. PATENT DOCUMENTS

| | | | |
|---|---|---|---|
| 1,175,128 | 3/1916 | Cook | 180/379 |
| 4,213,512 | 7/1980 | Mazziotti | 180/379 |
| 4,875,538 | 10/1989 | Hodgson | 180/379 |

FOREIGN PATENT DOCUMENTS

| | | |
|---|---|---|
| 0032971 | 8/1981 | European Pat. Off. . |
| 0058545 | 8/1982 | European Pat. Off. . |
| 433330 | 5/1944 | Sweden . |

*Primary Examiner*—Kenneth R. Rice
*Attorney, Agent, or Firm*—Young & Thompson

[57] ABSTRACT

The invention relates to a bearing arrangement for a propeller shaft (11, 12) which functions to drive at least one rear axle of a commercial vehicle, in which at least one running axle is mounted forwardly of the foremost driven rear axle but rearwardly of the forward end of the propeller shaft. The bearing arrangement includes a bearing housing (17) which is mounted on a component (13) in the vehicle and carries at least one bearing for the propeller shaft (11, 12), which includes two parts (11, 12) which are mutually connected at the bearing arrangement. According to the invention, the bearing housing (17) is mounted on the running axle (3), or on one of the running axles. A separate propeller-shaft intermediate part (18) is journaled on the bearing housing (17) and each of the ends of this intermediate part are provided with connecting devices (19) for connection to the two parts (11, 12) of the propeller shaft.

4 Claims, 3 Drawing Sheets

BEARING ARRANGEMENT FOR A PROPELLER SHAFT OF A COMMERCIAL VEHICLE

The present invention relates to a bearing arrangement for a propeller shaft intended for driving at least one rear axle of a commercial vehicle which has at least one running axle mounted forwardly of the foremost driven rear axle, but rearwardly of the front end of the propeller shaft, said bearing arrangement comprising a bearing housing which is mounted on a vehicle component and supports at least one propeller-shaft bearing, said shaft comprising two parts which are mutually joined at the bearing arrangement.

In commercial vehicles which have several rear axles, for instance mounted in a boggie, it may be desirable at times for the drive to take place through the rearwardly located rear axle, wherein the forwardly located axle constitutes a running axle. One example of this is found in semi-trailer towing vehicles. In towing vehicles of this kind, the smallest possible overhang is desired rearwardly of the turning table to which the semi-trailer is connected. At the same time, in order to obtain the best possible traction, it is desired to mount the turning table above the driving axle, or as close to this axle as possible.

Large spring movements are often used in modern commercial vehicles, which is particularly applicable to vehicles equipped with air-cushion springs. When a vehicle of this kind equipped with one or more running axles in front of the driving rear axle has an undivided propeller shaft, problems created by collisions between the propeller shaft and the running axle or axles can occur in the event of extreme spring movements, and naturally these problems must be avoided. Consequently, it has not been possible hitherto utilize large spring movements of desired magnitudes.

The object of the present invention is to avoid this drawback and to provide a bearing arrangement which will enable very large spring movements to be utilized on both running axles and drive axles. This object is achieved in accordance with the invention with the aid of a bearing arrangement of the aforedescribed kind which is characterized in that the bearing housing is mounted on the running axle or on one of the running axles, and in that a separate propeller-shaft intermediate part is journaled in the bearing housing and is provided at both ends thereof with devices for connection with the two parts of the propeller shaft located forwardly of and rearwardly of the bearing arrangement. This bearing arrangement enables the running axle to execute very large spring movements without being impeded by the propeller shaft.

Figure 2:
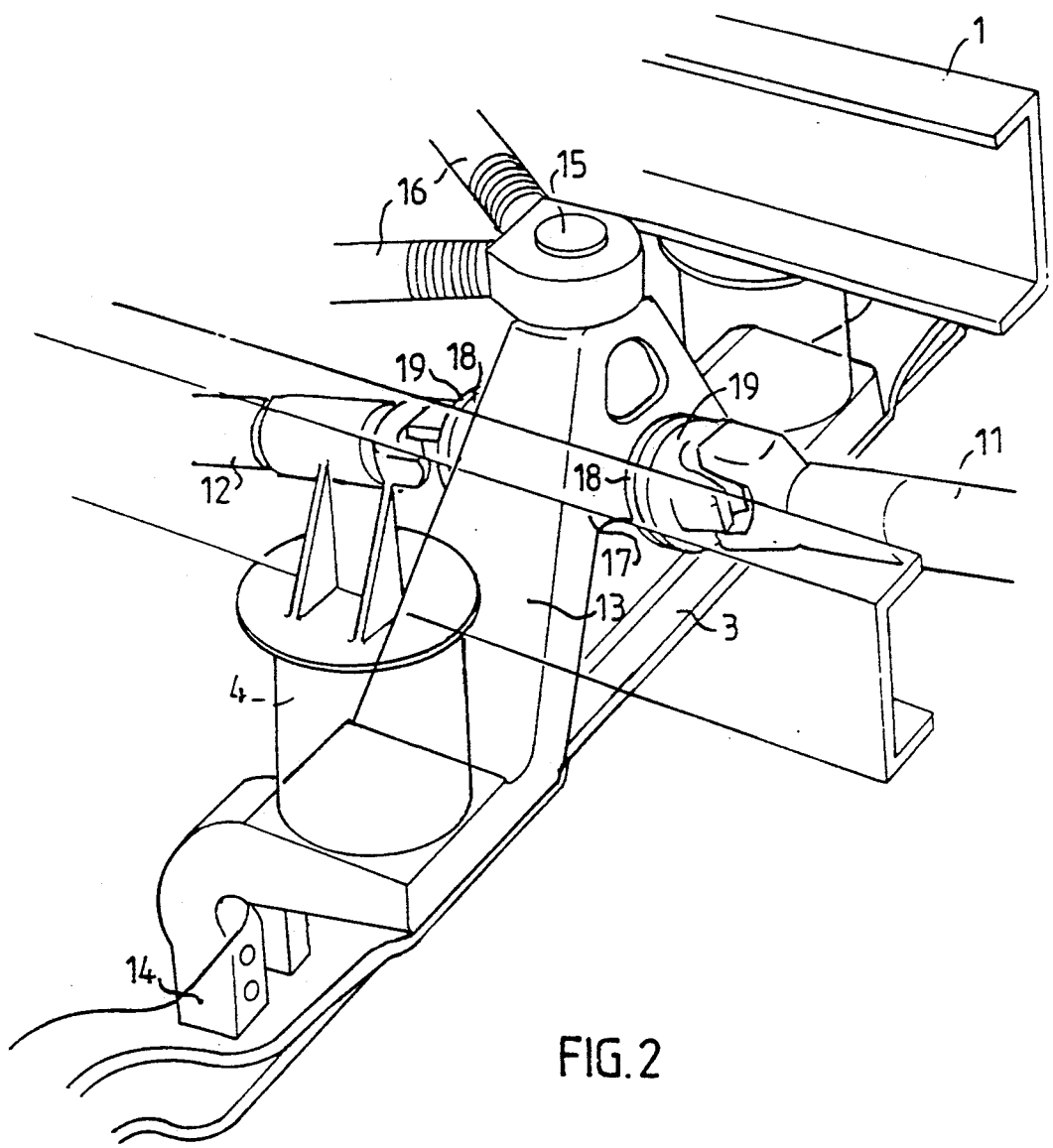
Figure 3:
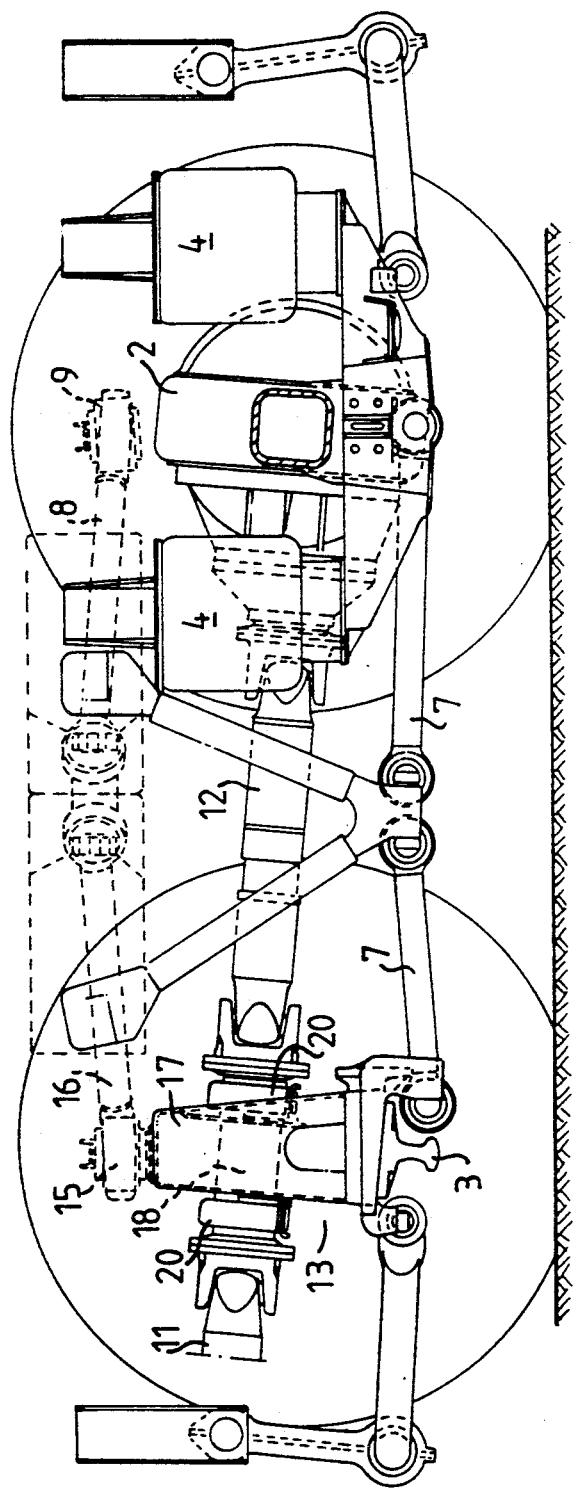

The invention will now be described in more detail with reference to the accompanying drawings, which illustrate an exemplifying embodiment of the invention and in which FIG. 1 is a schematic perspective view of the rear part of a commercial vehicle fitted with a boggie which is provided with a bearing arrangement according to one embodiment of the invention;

FIG. 2 is an enlarged perspective view of the bearing arrangement illustrated in FIG. 1; and FIG. 3 is a schematic side view of a boggie fitted with a bearing arrangement according to another embodiment of the invention.

FIG. 1 illustrates the rear part of a frame 1 of a commercial vehicle, for instance a lorry or truck. The frame 1 is supported by means of a number of aircushion springs 4 on a boggie fitted with a rearwardly located, driven rear axle 2 and a forwardly located running or idling axle 3. The driven rear axle 2 carries wheels 5, whereas the running axle 3 carries wheels 6.

The spring movements of the driven rear axle 2 are guided by a lower reaction strut 7 and an upper reaction strut 8 which are of V-configuration with the points of the respective Vs connected to an attachment 9 on the axle 2 and with the legs of the V connected to the attachments 10 on the frame 1.

The driven rear axle 2 is driven by means of a propeller shaft which includes a forward propeller-shaft part 11 and a rear propeller-shaft part 12. The forward end of the forward part 11 of the propeller shaft is connected to the power transmission arrangement connected to the vehicle power plant or engine, whereas the rear end of the rearward part 12 of the propeller shaft is connected to a final drive gear in the driven rear axle 2.

An inventive bearing arrangement, illustrated in larger scale in FIG. 2, is mounted between the forward part 11 of the propeller shaft and the rear part 12 of said shaft. The bearing arrangement includes a bridge element 13 which is mounted on the running axle 3. Since the running axle 3 is not a non-driven axle, the axle has the configuration of a straight bar, at least in the region of its centre, on which the bridge element 13 is attached, in the illustrated embodiment by means of downwardly extended attachment 14 which are secured to the axle 3 by means of screws not shown. The centre part of the bridge element 13 projects above the running axle 3. Provided at the top of the bridge element is an attachment 15 for securing the pointed part of a V-shaped reaction strut 16, the legs of which are secured to the attachments 10 on the frame 1.

Mounted in the centre part of the bridge element 13, beneath the attachment 15, is a bearing housing 17 which accommdates bearings (not shown) intended for an intermediate part 18 of the propeller shaft. Each end of this intermediate part 18 has provided thereon a connecting device 19 for connection to the forward part 11 of the propeller shaft and the rear part 12 of said shaft respectively. The connecting devices 19 are configured to form universal joints, in coaction with supplementary parts on the propeller-shaft parts 11 and 12 respectively. Thus, the forward part 11 and the rearward part 12 of the propeller shaft are pivotally connected to the intermediate part 18 of the propeller shaft, in a manner such that the arrangement will permit angular movement when the running axle 3 executes spring movements.

FIG. 3 illustrates a slightly modified embodiment of the inventive bearing arrangement. Those parts which have direct correspondence in the arrangement illustrated in FIGS. 1 and 2 have been identified with the same reference numerals. The FIG. 3 embodiment differs from the embodiment illustrated in FIGS. 1 and 2 mainly in that the bearing housing 17 is provided with external bearing holders 20, in which the bearings intended for the intermediate part 18 of the propeller shaft are arranged. In other respects, the bearing arrangement illustrated in FIG. 3 has substantially the same construction as the bearing arrangement earlier described with reference to FIGS. 1 and 2.

It will be apparent from the aforegoing that the inventive bearing arrangement will enable the running axle 3 on the boggie to execute very large spring movements without risk of coming into contact with the propeller shaft. Naturally, the forward part 11 and the rearward part 12 of the propeller shaft must be provided with means for taking-up those changes in length that occur when the running axle 3 executes its spring movements. Such means, however, are well known to the person skilled in this art and do not therefore need to be described here.

It will be understood that the invention is not restricted to the aforedescribed exemplifying embodiments, and that changes and modifications can be made within the scope of the following claims. For instance, on some occasions, it may be desirable to mount two running axles forwardly of the driven rear axle. This may be necessary, for instance, to fulfill vehicle regulations pertaining to axle loads, wheel bases and like regulations and to achieve maximum load-carrying ability within the framework of these regulations. In such cases, the bearing arrangement is mounted on one of the running axles. The conditions prevailing in the area of use concerned will therewith determine which of the running axles is to carry the bearing arrangement.

We claim:

1. In a bearing arrangement for a propeller shaft (11, 12) intended for driving at least one rear axle of a commercial vehicle, in which at least one running axle is mounted forwardly of the foremost driven rear axle but rearwardly of the forward end of the propeller shaft (11, 12), said bearing arrangement comprising a bearing housing (17) which is mounted on a component (3) in the vehicle and carries at least one bearing for the propeller shaft (11, 12), said propeller shaft comprising two parts (11, 12) which are mutually connected at the bearing arrangement; the improvement wherein the bearing housing (17) is mounted on a said running axle (3); the propeller shaft including a separate, intermediate part (18) which is journaled in the bearing housing (17); each end of said intermediate part having connecting devices (19) by which said intermediate part is connected between said two parts (11, 12) of said propeller shaft.

2. An arrangement according to claim 1, wherein the bearing housing (17) is arranged in a bridge element (13) which is connected to the running axle (3) and which extends over the axle (3) in the transverse direction of the vehicle.

3. An arrangement according to claim 2, wherein the bridge element (13) is provided with at least one attachment (15) for the attachment of a reaction strut (16) which functions to guide movements of the running axle (3).

4. An arrangement according to claim 1, wherein each of the connecting devices (19) comprises a part which when connected with the propeller-shaft parts (11, 12) respectively located forwardly and rearwardly of the bearing arrangement forms a universal joint.

* * * * *